United States Patent [19]

Yoshimi et al.

[11] Patent Number: 4,582,124
[45] Date of Patent: Apr. 15, 1986

[54] AUTOMOTIVE AIR CONDITIONING SYSTEM WITH AUTOMATIC CONTROL OF REFRIGERATOR COMPRESSOR CAPACITY AND HEATER AIR MIXING DAMPER

[75] Inventors: Akiro Yoshimi, Obu; Masao Nishimura, Anjo; Masashi Takagi, Kariya; Yasuyuki Nishi; Masao Sakurai, both of Obu, all of Japan

[73] Assignee: Nippondenso Co., Ltd., Kariya, Japan

[21] Appl. No.: 744,307

[22] Filed: Jun. 13, 1985

Related U.S. Application Data

[63] Continuation of Ser. No. 448,439, Dec. 10, 1982, abandoned.

[30] Foreign Application Priority Data

Dec. 16, 1981 [JP] Japan ................ 56-204330

[51] Int. Cl.$^4$ ............ F25B 1/04; F25B 29/00; B60H 3/00; B61D 27/00
[52] U.S. Cl. ................ 165/28; 165/30; 165/43; 62/228.5; 62/229; 62/323.4; 417/310
[58] Field of Search ............ 62/226, 323.4, 229, 62/239; 165/30, 28

[56] References Cited

U.S. PATENT DOCUMENTS

| | | | |
|---|---|---|---|
| 3,687,572 | 8/1972 | Glanvall | 417/310 |
| 4,060,343 | 11/1977 | Newton | 417/310 X |
| 4,132,086 | 1/1979 | Kountz | 62/228 X |
| 4,356,705 | 11/1982 | Sutoh et al. | 62/243 X |
| 4,358,936 | 11/1982 | Ito et al. | 165/43 X |
| 4,395,203 | 7/1983 | Takada | 417/292 X |
| 4,416,324 | 11/1983 | Sutoh et al. | 165/43 X |

Primary Examiner—William R. Cline
Assistant Examiner—John K. Ford
Attorney, Agent, or Firm—Cushman, Darby & Cushman

[57] ABSTRACT

An automotive air conditioning system has refrigeration devices, heating devices and a single chip microcomputer. The refrigeration devices include a variable displacement refrigeration compressor drivingly connectable by an electromagnetic clutch to an automotive engine and a refrigerant evaporator disposed in an air duct, through which air is caused to flow by a blower. The heating devices include a heater core disposed downstream of the refrigerant evaporator, through which heated air is caused to flow, and an air mixing damper which regulates the quantity of air to be introduced into the heater core. A condition relating to the air conditioning operation such as the temperature of the vehicle is detected by a sensor. The microcomputer receives the signals from the sensor, calculates a required injection temperature, compares the required injection temperature and a preset standard temperature, a lower standard temperature and a higher standard temperature and produces operating signals. The operating signals manage the connection of the electromagnetic clutch, vary the displacement of the refrigeration compressor, regulate the degree of opening of the air mixing damper and control the rotating velocity of the blower.

25 Claims, 7 Drawing Figures

AUTOMOTIVE AIR CONDITIONING SYSTEM WITH AUTOMATIC CONTROL OF REFRIGERATOR COMPRESSOR CAPACITY AND HEATER AIR MIXING DAMPER

This is a continuation of application Ser. No. 448,439, filed Dec. 10, 1982 and abandoned in favor hereof.

FIELD OF THE INVENTION

The present invention relates to a method to control an automotive air conditioning system, comprising a capacity varying means for controlling the capacity of a cooler through variation of the discharge capacity of a compressor and an air mixing damper for controlling the quantity of air passing through a heater.

DESCRIPTION OF THE PRIOR ART

As is shown in the Japanese published examined patent application, No. Sho-52-37858, a typical conventional control device employs a switch to detect the position of an air mixing damper used for regulating the quantity of heat for reheating and stops heating when the air mixing damper is at the position where the damper closes the heater. However, in the conventional control device, the degree of opening of the air mixing damper is only automatically controlled and therefore the compressor is operating continually at the maximum discharge capacity. Thus, the conventional control devices have a disadvantage that considerably more power is consumed to drive the compressor than is really required.

SUMMARY OF THE INVENTION

The present invention has been devised to cope with the said disadvantage and has the object to provide a good temperature control of an automobile while eliminating use of an excess of the power for driving a compressor through automatic control of an air mixing damper which is combined with a means for varying the capacity of the compressor.

The principal feature of the present invention is that automatic control is made mainly of the discharge capacity of a compressor when the required blow-off temperature is below the standard temperature and mainly of the degree of opening of an air mixing damper when the injection temperature is above the standard temperature.

The compressor displacement varying means may comprise two unloading ports formed in the compressor and being adapted to release the refrigerant being compressed and a valve member operatively associated with the unloading port. When the unloading port is opened by the valve member, the compression of the refrigerant in a working space in the compressor is not started until after the working space is moved out of communication with the unloading port. Thus, the displacement of the compressor is reduced from the maximum compressor displacement which is obtained when the unloading ports are all closed by the associated valve members. The valve members are opened and closed in accordance with the signal emitted by the sensor means.

The degree of opening of the air mixing damper is calculated according to a required injection temperature, and comparison is made between a calculated degree of opening and a real degree of opening of the air mixing damper, by the micro-computer. Then a signal is sent to the opening degree regulating actuator in order to make a real damper opening closer to a target damper opening.

BRIEF DESCRIPTION OF THE DRAWINGS

These and other objects of the invention will be readily appreciated by reference to the description, taken in connection with the accompanying drawings, in which.

DETAILED DESCRIPTION OF THE PREFERRED EMBODIMENTS

Figure 1:
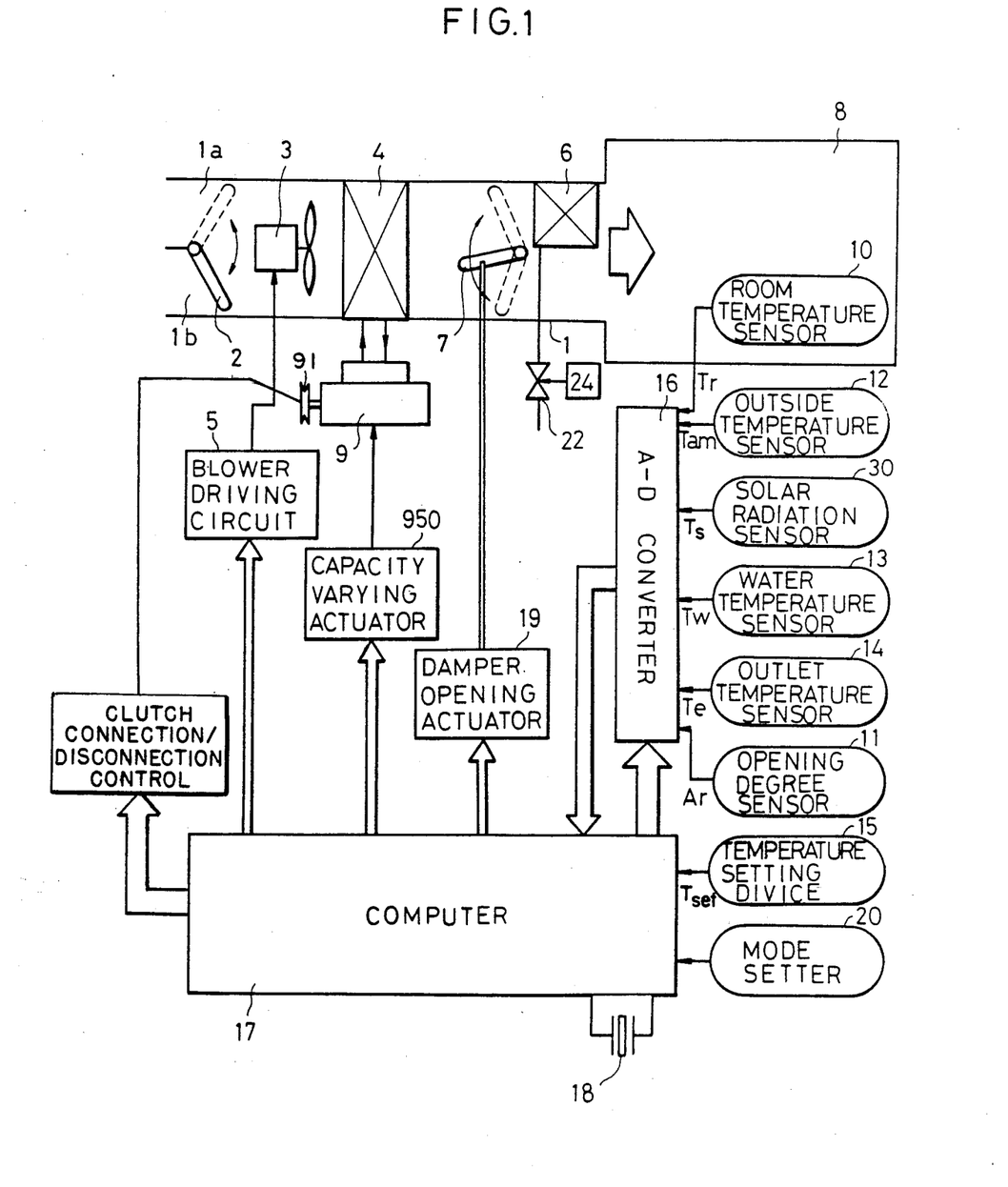
FIG. 1 shows the overall construction of an embodiment of the present invention.

The present invention will be described with reference to the embodiment shown in the attached drawings. FIG. 1 shows an air duct 1 which conducts air as a warming or cooling medium used in an automotive air conditioner. The air in the outside is taken into a vehicle through an outer air intake gate 1a and the air within a vehicle is circulated through an inner air intake gate 1b. A changeover damper 2 is used to provide a manual change between outer air induction and inner air circulation. The solid line shows the state of outer air induction and the dotted line illustrates the state of inner air circulation. A blower motor 3 is used to take air from the outer air gate 1a or the inner air gate 1b and sends the air to a vehicle room 8. The air sent by the said blower motor 3 is cooled during its passage through an evaporator 4, which is mounted across the section of the air duct 1.

A compressor 9 is connected through a clutch 91 to an engine, an on-board power source, and is operated by the rotational driving force of the engine. The compressor compresses a refrigerant and sends it to a condenser (not shown), where the high pressure refrigerant is liquefied. The liquefied refrigerant is then passed through an expansion valve and the refrigerant is converted to a low pressure and low temperature liquid. The liquid is sent to the said evaporator 4, where the refrigerant absorbs some of the heat of the air sent from the blower, then the refrigerant is converted to a low pressure and low temperature gas, which is sent out for circulation.

FIGS. 2 and 3(a) through 3(c) illustrate the construction of the compressor 9. The compressor involves a cylindrical rotor 901, a vane 901a which is slidable in the radial direction of the rotor and is mounted in a slit 901b situated in the rotor 901, and a cylinder 902 to control the radial reciprocating motion of the vane 901a. The cylinder 902 is interposed between a front side plate 903 and a rear side plate 904, which are faced, through a limited space, against the said rotor 901 and the said vane 901a, respectively. Operating spaces V are formed by the rotor 901, the vanes 901a, the cylinder 902, the front side plate 903, and the rear side plate 904. The rotor 901 is integrally connected to a rotating shaft 901c, which is rotationally supported by the front side plate 903 and the rear side plate 904 through a bearing 907 and is driven by the driving force of an engine through an electromagnetic clutch 91.

Figure 2:
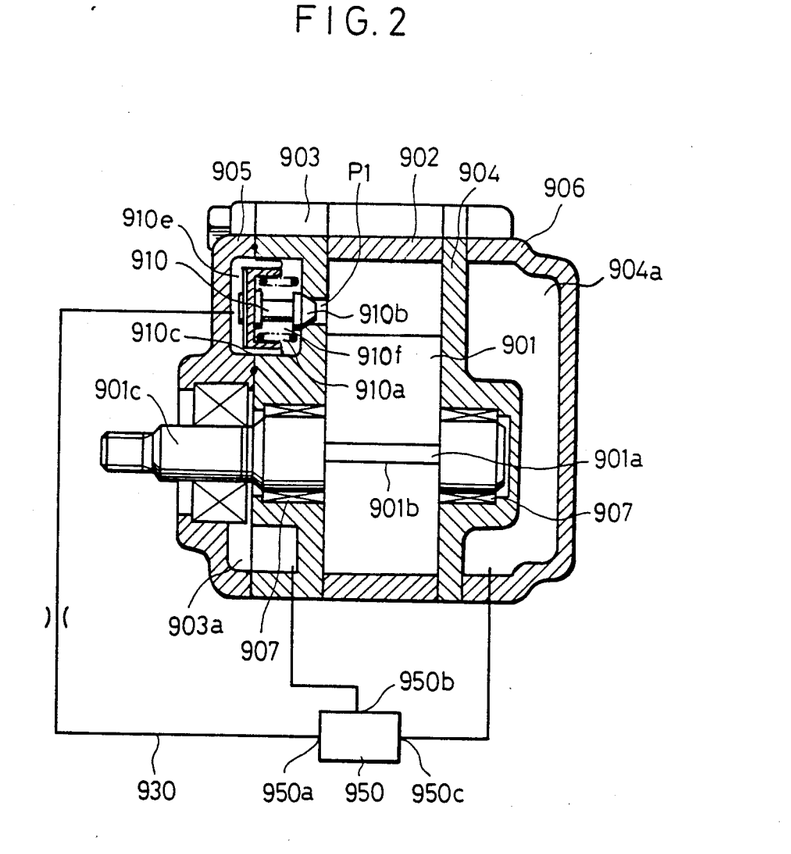
FIG. 2 illustrates a cross-sectional view of the compressor as in FIG. 1, FIG. 3(a), FIG. 3(b) and FIG. 3(c) illustrate the discharge capacities of the compressor as shown in FIG. 2.
Figure 3A:
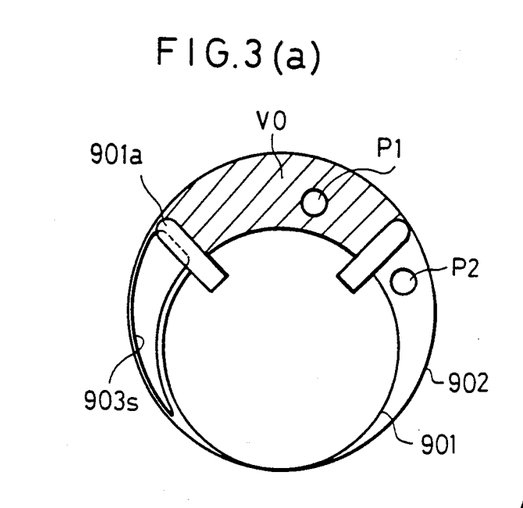

An induction space 903a is formed by the front side plate 903 and a housing 905. A refrigerant is induced into the induction space 903a from an evaporator in a refrigerating cycle (not shown) and is sucked into the operating spaces V through an induction port 903s with an opening to the front side plate 903. At this time, the operating space Vo is filled with a refrigerant by the induction pressure, as shown in FIG. 3(a). As the volume of the operating space Vo is decreased, the inducted refrigerant is compressed. The refrigerant compressed to the extreme state is discharged to a discharge space 904a through an outlet 902d and then discharged to a condenser in a refrigeration cycle.

Figure 3B:
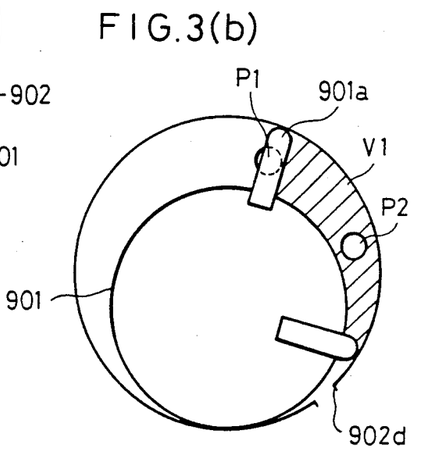

Unloading ports, P1 and P2, are opened to the front side plate 903 and provide connection between the operating spaces V and the induction space 903a. Therefore, while the unloading port P1 is opened, no compression of a refrigerant is made until each of the operating spaces V is disconnected from the unloading port P1 and the space volume V1 at the start of compression when the unloading port P1 is opened is smaller than the space volume Vo at the start of compression when the unloading port P1 is closed. In this embodiment, the unloading port P1 is opened at such position that V1 is about 70% of Vo, as shown in FIG. 3(b).

Figure 3C:
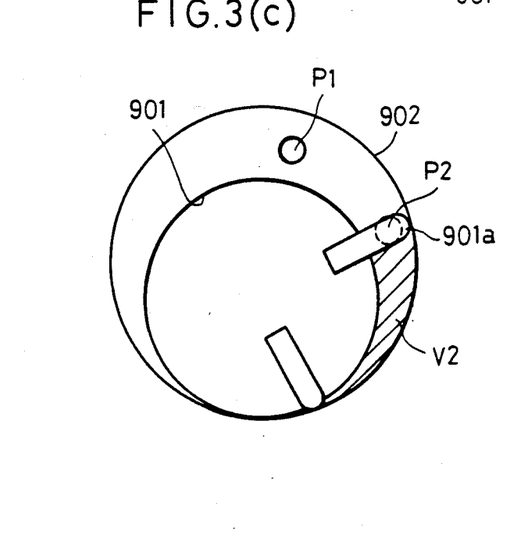

The space volume V2 at the start of compression when the unloading port is opened is about 30% of Vo, as shown in FIG. 3(c).

Switch valves, 910 and 911, have capacity varying means and are used to open or shut the unloading ports, P1 and P2, respectively. Here, the switch valve 911 is not shown because it has the same construction as the valve 910. As illustrated in FIG. 2, the switch valve 910 has a valve body 910b which is mounted in or demounted from the port P1, a spring 910a which presses the valve body 910b with a required load, to the opening direction and a bellows diaphragm 910c which has a spring seat and drives the valve body 910b. The space 910e on the rear side of the bellows diaphragm 910c is open to a pilot pressure induction path 903, through which is applied a pilot pressure, namely, an intake pressure or discharge pressure, by control of an electromagnetic valve 950. On the other hand, the pressure of the intake space 903a is applied to the space 910f on the front side of the bellowphragm 910c. And, another switch valve 911 is controlled by an electromagnetic valve 951 with the same construction as the valve 950.

As shown in FIG. 2, the electromagnetic valve 950 has three ports, namely, an intake pressure induction port 950b, a discharge pressure induction port 950c, and a pilot pressure induction port 950a. An intake pressure or a discharge pressure is selectively induced to the pilot pressure induction port 950a of the electromagnetic valve 950, by ON/OFF operation of the coil.

When an intake pressure is introduced to the pilot pressure induction port 950a, the pilot chamber 910e exhibits the intake pressure and therefore the valve body 910b is moved to the opening direction by a predetermined force of the spring 910a. Thus, the switch valve 910 (or 911) will be opened. On the contrary, when a discharge pressure is introduced to the pilot pressure induction port 950a, the pilot chamber 910e exhibits the discharge pressure and therefore the valve body 910b moves to the closing direction against a predetermined force of the spring 910a. Thus, the switch valve 910 (or 911) will be closed.

In the following, description will be made of an air conditioner, again by reference to FIG. 1. A heater core 6, mounted in the air duct 1, is a heater, which heats the air blown in the core by use of the heat of engine cooling water induced into the core. An air mixing damper 7, located in the flow of dehumidified and cooled flow which has passed through an evaporator 4, regulates the ratio of the quantity of the air to be introduced and heated in the heater core 6 and the quantity of the air to be branched, and thus controls the temperature of the air to be blown into vehicle room 8, by appropriate mixing of cool air and warm air. The degree of opening of the air mixing damper 7 is automatically controlled to maintain the room temperature at a predetermined level, on the basis of various factors such as ambient temperature, preset temperature and the feedback of the degree of opening of the damper.

A room temperature sensor detects the temperature in the room 8 and generates the temperature signal. An opening degree sensor 11 detects the degree of opening of the air mixing damper 7 and generates the opening signal. The sensor 11 feeds back the opening degree information for the temperature control by use of a potentiometer linked with the motion of the air mixing damper 7. An outside temperature sensor 12 detects outdoor temperature and generates the outside temperature signal. A temperature setting device 15 is used to set a target temperature for control. A driver or a passenger sets manually a desired target temperature with the device 15. A water temperature sensor 13 detects the temperature of the water at the inlet of the heater core 6, an evaporator outlet temperature sensor 14 detects the temperature of the air at the outlet of the evaporator 4, and a solar radiation sensor 30 detects the quantity of solar radiation. A mode setter 20 is used to manually set various operating modes such as a heater mode, a defroster mode and a cooler mode in an automotive air conditioner, and generates a digital mode signal for each of these modes. An A/D converter 16, which converts an analog signal into a digital signal, converts successively a room temperature signal (Tr) from a room temperature sensor 10, an opening signal (Ar) from an opening degree sensor 11, an outside temperature signal (Tam) from an outside temperature sensor 12, a water temperature signal (Tw) from a water temperature sensor 13, an outlet temperature signal (Te) from an outlet temperature sensor 14 and a solar radiation signal (Ts) from a solar radiation sensor 30 into respective digital signals.

A single chip microcomputer 17 executes digital processing of software in accordance with a predetermined air conditioning program. The computer, having a digital processing unit, is linked with a quartz oscillator 18 with a frequency range of several MHz and is put into operation as it receives the supply of a stabilized voltage from a stabilized power circuit (not shown) which generates a stabilized voltage in accordance with the power supply from an onboard battery. The microcomputer 17 processes relevant data and generates an instruction signal to regulate the rpm of a blower motor 3, an instruction signal to operate an actuator 24 for regulating a warm water valve 22, an instruction signal to effectively vary the discharge capacity of a compressor 9, an instruction signal to engage and disengage an electromagnetic clutch, and an instruction signal to regulate the degree of opening of an air mixing damper 7.

The microcomputer 17 is made of a single chip LSI, mainly comprising a ROM(Read Only Memory) which memorizes an air conditioning program to determine the processing procedures for generation of the said instruction signals, a CPU(Central Processing Unit) which successively reads out the statements of the said are conditioning ROM program and executes processing of the statements, a RAM(Random Access Memory) which temporarily memorizes various data required for the processing of the CPU and readily readable by the CPU, a clock pulse generator which possesses a quartz oscillator and generates standard clock pulses required for the said processing operations and an I/O circuit which regulates input and output of various signals.

An opening degree actuator 19, which regulates the degree of the opening of the air mixing damper 7, operates in accordance with an instruction signal for opening degree regulation, given from the microcomputer 17 which processes relevant data for room temperature control. A driving circuit 5 regulates the rpm of the blower 3 in accordance with a signal from the microcomputer 17.

A warm water valve 22 is used to open or shut a path for cooling water which comes from an engine 23 and circulates through a heater core 6. The valve 22 is opened or shut by an actuator 24 for the valve control, which is operated by an instruction signal from a microcomputer 17.

Figure 4:
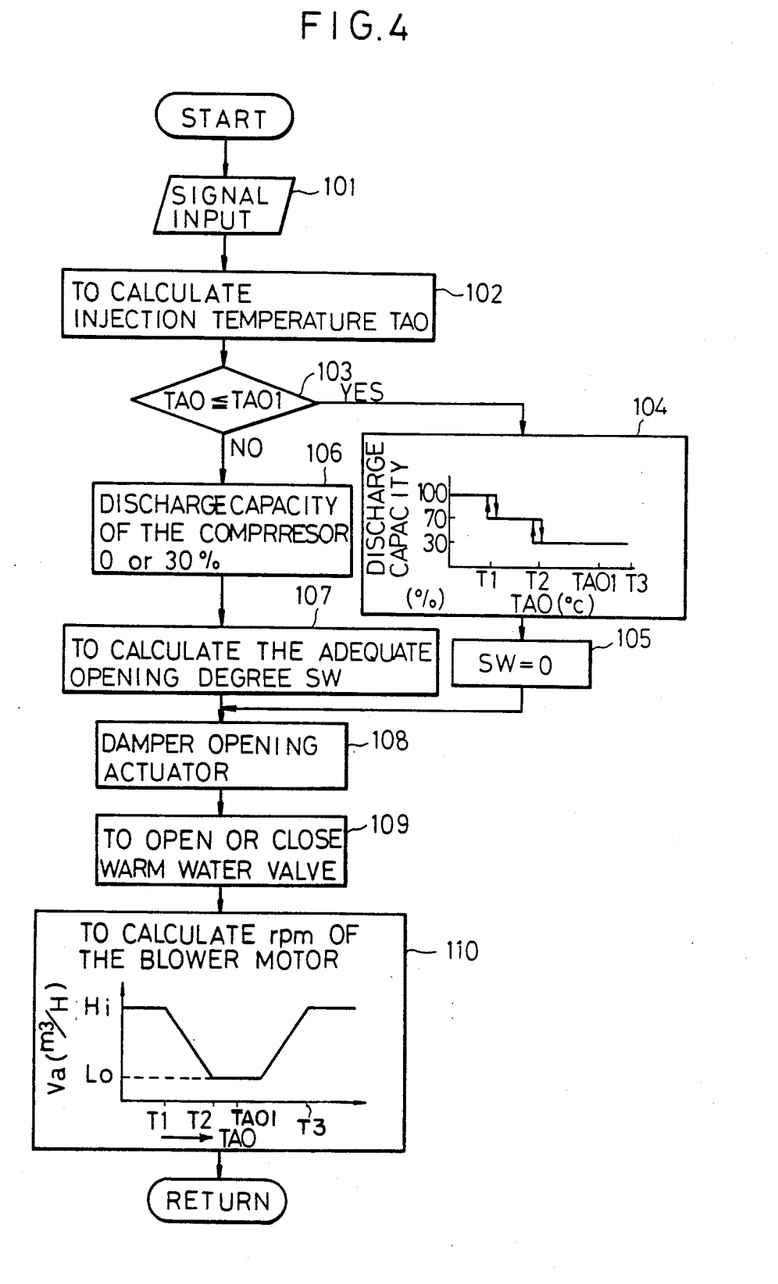
FIG. 4 shows a flow chart of control programs of a microcomputer as shown in FIG. 1.

The operation of the present control system will be described by reference to the flow chart in FIG. 4. The flow chart illustrates main control functions of the present invention: such as opening and shutting control of capacity varying means (an electromagnetic valve 950, switch valves 910,911 etc), position control of an air mixing damper 7, opening and shutting of an electromagnetic valve and a warm water valve 22. However, conventional techniques may be referred to, as for other control functions.

In operation, a microcomputer 17 executes computational processing of the air conditioning program shown in the flow chart in a periodic cycle of several hundred microseconds.

In the signal input step 101, a digital room temperature signal Tr obtained through an A/D converter 16 from a room temperature sensor 10, an outside temperature signal Tam, an evaporator outlet temperature signal Te, a water temperature signal Tw, an air mixing damper opening signal Ar, a solar radiation signal Ts, and a set temperature signal Tset are entered and memorized, followed by a calculation step 102 to compute a required injection temperature TAO. This is computed from the data entered in the signal input 101, by use of the following equation.

$$TAO = Kset \times Tset - Kr \times Tr - Kam \times Tam - Ks \times Ts + C$$

(Kset, Kr, Kam, Ks and C are predetermined constants)

In the next step 103, comparison is made between a preset main standard temperature TAO1 and the required injection temperature TAO obtained in the step 102, in order to determine the opening degree of the air mixing damper 7. Namely, as described later as step 107, if the required injection temperature TAO is higher than the preset main standard temperature TAO1, the air mixing damper 7 is opened, the opening degree being based on the required injection temperature TAO. On the other hand, if the required injection temperature TAO is lower than the preset main standard TAO1, the opening degree of the air mixing damper 7 is kept at its lowest.

In the step 104, there are three preset substandard temperatures, lower T1, medium T2 and higher T3. The preset main standard temperature TAO1 of this embodiment is set between the medium substandard temperature T2 and the higher substandard temperature T3, as shown in FIG. 4. When the required temperature TAO is lower than a preset substandard temperature T1, cooling operation is to be made at the highest capacity of a cooling equipment. In this condition, a high pressure is introduced to a back pressure space 910e of the switch valves 910, 911 of a compressor 9 and thus the discharge capacity takes a maximum value as shown in FIG. 3(a). When a required injection temperature TAO takes a value between a preset lower substandard temperature T1 and the a preset medium substandard temperature T2, only one switch valve 910 opens the unloading port P1 and the compressor 9 is operated at a discharge capacity of about 70% as shown in FIG. 3(b). As a required injection temperature TAO increases, the necesity to cool a vehicle room decreases. Therefore, if required injection temperature TAO is above the medium substandard temperature T2, both switch valves 910,911 open unloading ports P1, P2 and the compressor is operated at a discharge capacity of about 30% as shown in FIG. 3(c).

In a cooling condition when the step 104 is processed, the step 105 is processed to minimize the degree of opening SW of the air mixing damper 7 and an air stream does not flow into the heater core 6.

The condition that the required injection temperature TAO is lower than the preset main standard temperature TAO1 is usually a cooling condition, and it is not necessary to heat the air using the heater core 6. Therefore, the step 105 is processed to minimize the degree of opening SW of the air mixing damper 7 and an air stream does not flow into the heater core 6.

The step 106 is processed when the required injection temperature TAO is higher than the preset main standard temperature TAO1, the condition of which is usually a warming condition and high capacity of the compressor 9 is not needed. Therefore, the electromagnetic clutch is turned off when the condition is detected, in which a required injection temperature TAO takes a value higher than a preset higher substandard temperature T3. This is because air cooling is no longer necessary in such condition. On the other hand, when TAO is between TAO1 and T3, the discharge capacity is set to be about 30%. If T3 is set to be higher, the seasonal period becomes longer during which a vehicle room can be dehumidified.

In the step 107, calculation is made of the degree of opening SW of the air mixing damper corresponding to a required injection temperature TAO, in accordance with the following condition.

Then, in the step 108, comparison is made between a calculated opening degree SW and a real opening degree Ar of the damper and a signal is sent to the opening degree regulating actuator 19 with a purpose to make a real damper opening Ar closer to a target damper opening SW.

In the next step 109, when a target damper opening SW calculated in the step 107 is larger than 10%, a signal to open the warm water valve 22 is given to an actuator 24 for driving the valve 22 and when a target damper opening is smaller than 5%, a signal to close the warm water valve 22 is given to the actuator 24 for driving the valve 22.

In the step 110, the rpm of a blower motor 3 is controlled in accordance with a required injection temperature TAO. Maximum cooling or heating is required when a required injection temperature TAO is lower than the lower substandard temperature T1 or higher than the higher substandard temperature T3, respectively. In these conditions, the blower motor 3 is required to be rotated at a higher speed, to provide sufficient cooling or heating rate.

Automatic control can be made for a wide range of operations from cooling to warming, by repetitive execution of the above control programs.

Figure 5:
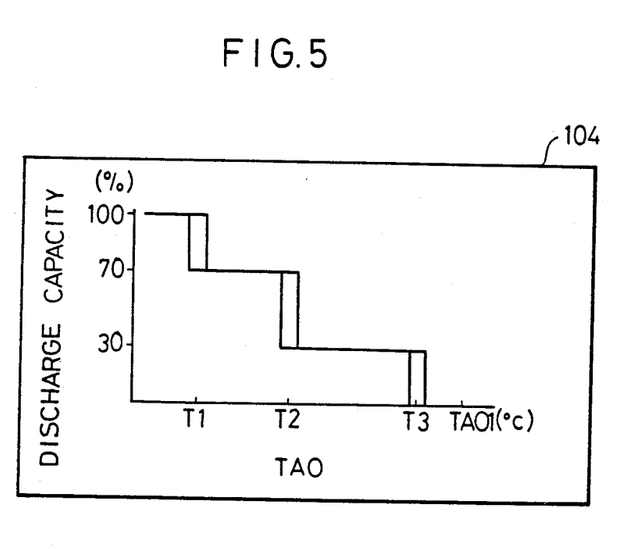
FIG. 5 shows an alternative to the step 104 illustrated in FIG. 4.

In the above example, higher substandard temperature T3 is set to be higher than the standard temperature TAO1. Therefore, in the step 104, the electromagnetic clutch is always connected and the compressor 9 operates at a small capacity, even when the air mixing damper 7 begins to open. However, the temperature for disconnection of the electromagnetic clutch (the higher substandard temperature T3) may be set to be lower than the standard temperature TAO1, as shown in FIG. 5. In this case, the air mixing damper 7 begins to open after the discharge capacity has decreased in the sequence, large-medium-small-zero.

As has been described, the present invention has such excellent effects as to provide automatic control of a wide range of operations of an automotive air conditioner from cooling to heating, decrease the discarge capacity of a compressor in accordance with the operating conditions, and thus save the power loss.

What is claimed is:

1. An automotive air conditioning system, comprising:
   an air duct communicated to a vehicle room for supplying air to such room;
   an air blower interposed in said air duct and constructed and arranged for blowing air through said air duct towards said vehicle room;
   a refrigerant evaporator interposed in said air duct so as to be in heat-exchanging relationship with air flowing through said air duct towards said vehicle room;
   refrigerant compressor operatively associated with said evaporator;
   compressor unloading means operatively associated with said compressor for varying the displacement of said compressor;
   a capacity-varying actuator means operatively associated with said compressor unloading means for actuating said compressor unloading means to vary the displacement of said compressor;
   electromagnetic clutch means connected in driving relation with said compressor and being constructed and arranged to connect and disconnect said compressor in and from driven relation with an automotive engine;
   a heater core interposed in said air duct downstream of said evaporator;
   an air mixing damper interposed in said air duct and being constructed and arranged for regulating the ratio of air flowing through said air duct towards said vehicle room to be heated by passing in heat-exchanging relation with said heater core, versus air flowing through said air duct towards said vehicle room without passing in heat-exchanging relation with said heater core;
   means operatively associated with said air mixing damper for varying the degree of openness of said damper for varying said ratio;
   sensor means operative for detecting a condition in relation to air conditioning operation, said sensor means including at least a room temperature sensor constructed and arranged for detecting the temperature of said vehicle room;
   a target temperature setting device constructed and arranged to be accessible to a vehicle room occupant for setting a target temperature for said vehicle room; and
   computerized control means constructed and arranged to receive inputs from said sensor means and target temperature setting device and constructed and arranged to:
   (a) compute a required injection temperature at which the air must be provided by said air duct to said room in response to the signals from said sensor means and said temperature setting device,
   (b) compare said required injection temperature and a preset main standard temperature, a lower substandard temperature and at least one higher substandard temperature, and
   (c) compute an air mixing damper degree of openness based on said required injection temperature;
   and to send control signals to:
   (d) said capacity-varying actuator means for effecting variation in the displacement of said compressor for variably unloading the compressor;
   (e) said electromagnetic clutch means for connecting and disconnecting said compressor in and from driven relationship with an automotive engine; and
   (f) said air mixing damper degree of openness varying means, for varying said ratio of air flowing through said air duct and being heated by passing in heat-exchanging relation with said heater core,
   according to a program in which:
   (i) if said required injection temperature is below said lower substandard temperature, said control means signals said capacity-varying actuator means for effecting full-capacity operation of said compressor and said electromagnetic clutch means to connect said compressor in driven relation to an automotive engine;
   (ii) if said required injection temperature is below at least one said higher substandard temperature which is above said lower substandard temperature, said control means signals said capacity-varying actuator means for effecting a respective less-than-full-capacity operation of said compressor and said electromagnetic clutch means to connect said compressor in driven relation to an automotive engine;
   (iii) if said required injection temperature is above each said substandard temperature, said control means signals said electromagnetic clutch means to disconnect said compressor from driven relation with an automobile engine;
   (iv) if said required injection temperature is below said main standard temperature said control means signals said air mixing damper degree of openness varying means to bypass air flowing in said air duct to said vehicle room without heating by said heater core; and (v) if said required injection temperature is above said main standard temperature said control means signals said air mixing damper, degree of openness varying means to pass some parts of air flowing in said air duct to said vehicle room with heating by said heater core.

2. The automotive air conditioning system of claim 1, wherein:

said computerized control means comprises a microcomputer.

3. An automotive air conditioning system as claimed in claim 1, wherein:

said sensor means includes an outside temperature sensor detecting outdoor temperature.

4. An automotive air conditioning system as claimed in claim 1, wherein:

said sensor means includes a water temperature sensor detecting the temperature of the water of said heating core.

5. An automotive air conditioning system as claimed in claim 1, wherein:

said sensor means includes an evaporator outlet temperature sensor detecting the temperature of the air at the outlet of said refrigerant evaporator.

6. An automotive air conditioning system as claimed in claim 1 wherein:

said sensor means includes a solar radiation sensor detecting the quantity of solar radiation.

7. The automotive air conditioning system of claim 1 wherein:

said blower is constructed and arranged to operate with variable rotational velocity; and said computerized control means is operatively connected to said blower for regulating rotational velocity of said blower in relation to the required injection temperature.

8. An automotive air conditioning system according to claim 2 wherein said main standard temperature is higher than each said at least one higher substandard temperature.

9. An automotive air conditioning system according to claim 2, wherein said main standard temperature is not less than said at least one higher substandard temperature.

10. An automotive air conditioning system, comprising:

an air duct communicated to a vehicle room for supplying air to such room;

an air blower interposed in said air duct and constructed and arranged for blowing air through said air duct towards said vehicle room;

a refrigerant evaporator interposed in said air duct so as to be in heat-exchanging relationship with air flowing through said air duct towards said vehicle room;

refrigerant compressor operatively associated with said evaporator;

compressor unloading means operatively associated with said compressor for varying the displacement of said compressor;

a capacity-varying actuator means operatively associated with said compressor unloading means for actuating said compressor unloading means to vary the displacement of said compressor;

electromagnetic clutch means connected in driving relation with said compressor and being constructed and arranged to connect and disconnect said compressor in and from driven relation with an automotive engine;

a heater core interposed in said air duct downstream of said evaporator;

an air mixing damper interposed in said air duct and being constructed and arranged for regulating the ratio of air flowing through said air duct towards said vehicle room to be heated by passing in heat-exchanging relation with said heater core, versus air flowing through said air duct towards said vehicle room without passing in heatexchanging relation with said heater core;

means operatively associated with said air mixing damper for varying the degree of openness of said damper for varying said ratio;

sensor means operative for detecting a condition in relation to air conditioning operation, said sensor means including at least a room temperature sensor constructed and arranged for detecting the temperature of said vehicle room;

a target temperature setting device constructed and arranged to be accessible to a vehicle room occupant for setting a target temperature for said vehicle room; and computerized control means constructed and arranged to receive inputs from said sensor means and said target temperature setting device and constructed and arranged to:

(a) compute a required injection temperature at which the air must be provided by said air duct to said room in response to the signals from said sensor means and said temperature setting device, (b) compare said required injection temperature and a preset main standard temperature, a lower substandard temperature and at least one greater substandard temperature, and (c) compute an air mixing damper degree of openness based on said required injection temperature;

and to send control signals to:

(d) said capacity-varying actuator means for effecting variation in the displacement of said compressor for variably unloading the compressor;

(e) said electromagnetic clutch means for connecting and disconnecting said compressor in and from driven relationship with an automotive engine; and (f) said air mixing damper degree of openness varying means, for varying said ratio of air flowing through said air duct and being heated by passing in heat-exchanging relation with said heater core, according to a program in which:

(i) if said required injection temperature is below both said preset main standard temperature and said lower substandard temperature, said control means signals said capacity-varying actuator means for effecting full-capacity operation of said compressor, said electromagnetic clutch means to connect said compressor in driven relation to an automotive engine, and said air mixing damper to bypass air flowing in said air duct to said vehicle room without heating by said heater core;

(ii) if said required injection temperature is below said preset main standard temperature and above said lower substandard temperature, said control means signals said capacity-varying actuator means for effecting a respective less-than-full-capacity operation of said compressor, said electromagnetic clutch means to connect said compressor in driven relation to an automotive engine, and said air mixing damper to bypass air flowing in said air duct to said vehicle room without heating by said heater core;

(iii) if said required injection temperature is above said main standard temperature and each said substandard temperature, said control means signals said electromagnetic clutch means to disconnect said compressor from driven relation with an automobile engine, and said air mixing damper to open; and (iv) if said required injection temperature is above said main standard temperature and below at least one said substandard temperature, said control means signals said capacity-varying actuator means for effecting a respective less-than-full-capacity operation of said compressor, said electromagnetic clutch means to connect said compressor in driven relation to an automotive engine, and said air mixing damper to open, degree of openness varying means to pass some parts of air flowing in said air duct to said vehicle room with heating by said heater core.

11. The automotive air conditioning system of claim 10, wherein:
said computerized control means comprises a microcomputer.

12. An automotive air conditioning system as claimed in claim 10, wherein:
said sensor means includes an outside temperature sensor detecting outdoor temperature.

13. An automotive air conditioning system as claimed in claim 10, wherein:
said sensor means includes a water temperature sensor detecting the temperature of the water of said heating core.

14. An automotive air conditioning system as claimed in claim 10, wherein:
said sensor means includes an evaporator outlet temperature sensor, detecting the temperature of the air at the outlet of said refrigerant evaporator.

15. An automotive air conditioning system as claimed in claim 10, wherein:
said sensor means includes a solar radiation sensor detecting the quantity of solar radiation.

16. The automotive air conditioning system of claim 10, wherein:
said blower is constructed and arranged to operate with variable rotational velocity; and
said computerized control means is operatively connected to said blower for regulating rotational velocity of said blower in relation to said required injection temperature.

17. The automotive air conditioning system of claim 10 wherein:
said computerized control means is constructed and arranged to control capacity of said compressor in relation to at least two said greater substandard temperatures, including a medium substandard temperature and, above that, a higher substandard temperature, both being above said lower substandard temperature, as follows:

(vi) if said required injection temperature is below said main standard temperature and below said medium substandard temperature but above said lower substandard temperature, said control means signals said capacity-varying actuator means for effecting intermediate-capacity operation of said compressor, said electromagnetic clutch means to connect said compressor in driven relation to an automotive engine, and said air mixing damper to bypass air flowing in said air duct to said vehicle room without heating by said heater core;

(vii) if said required injection temperature is below said main standard temperature and below said higher substandard temperature but above said medium substandard temperature, said control means signals said capacity-varying actuator means for effecting low capacity operation of said compressor, said electromagnetic clutch means to connect said compressor in driven relation to an automobile engine, and said air mixing damper to bypass air flowing in said air duct to said vehicle room without heating by said heater core; and (viii) if said required injection temperature is above main standard temperature and said medium substandard temperature and below said higher substandard temperature, said control means signals said capacity-varying actuator means for effecting low capacity operation of said compressor, said electromagnetic clutch means to connect said compressor in driven relation to an automobile engine, and said air mixing damper to pass at least part of air flowing in said air duct to said vehicle room with heating by said heater core.

18. An automotive air conditioning system, comprising:
an air duct communicated to a vehicle room for supplying air to such room;
an air blower interposed in said air duct and constructed and arranged for blowing air through said air duct towards said vehicle room;
a refrigerant evaporator interposed in said air duct so as to be in heat-exchanging relationship with air flowing through said air duct towards said vehicle room;
refrigerant compressor operatively associated with said evaporator;
compressor unloading means operatively associated with said compressor for varying the displacement of said compressor;
a capacity-varying actuator means operatively associated with said compressor unloading means for actuating said compressor unloading means to vary the displacement of said compressor;
electromagnetic clutch means connected in driving relation with said compressor and being constructed and arranged to connect and disconnect said compressor in and from driven relation with an automotive engine;
a heater core interposed in said air duct downstream of said evaporator;
an air mixing damper interposed in said air duct and being constructed and arranged for regulating the ratio of air flowing through said air duct towards said vehicle room to be heated by passing in heat-exchanging relation with said heater core, versus air flowing through said air duct towards said vehicle room without passing in heat-exchanging relation with said heater core;
means operatively associated with said air mixing damper for varying the degree of openness of said damper for varying said ratio;
sensor means operative for detecting a condition in relation to air conditioning operation, said sensor means including at least a room temperature sensor constructed and arranged for detecting the temperature of said vehicle room;
a target temperature setting device constructed and arranged to be accessible to a vehicle room occupant for setting a target temperature for said vehicle room; and
computerized control means constructed and arranged to receive inputs from said sensor means and said target temperature setting device and constructed and arranged to:
(a) compute a required injection temperature at which the air must be provided by said air duct to said room in response to the signals from said sensor means and said temperature setting device,
(b) compare said required injection temperature and a preset main standard temperature, a lower substandard temperature and at least one greater substandard temperature, and
(c) compute an air mixing damper degree of openness based on said required injection temperature;
and to send control signals to:
(d) said capacity-varying actuator means for effecting variation in the displacement of said compressor for variably unloading the compressor;
(e) said electromagnetic clutch means for connecting and disconnecting said compressor in and from driven relationship with an automotive engine; and
(f) said air mixing damper degree of openness varying means, for varying said ratio of air flowing through said air duct and being heated by passing in heat-exchanging relation with said heater core,
according to a program in which:
(i) if said required injection temperature is below both said preset main standard temperature and said lower substandard temperature, said control means signals said capacity-varying actuator means for effecting full-capacity operation of said compressor, said electromagnetic clutch means to connect said compressor in driven relation to an automotive engine, and said air mixing damper to bypass air flowing in said air duct to said vehicle room without heating by said heater core;
(ii) if said required injection temperature is below said preset main standard temperature and below at least one said greater substandard temperature but above said lower substandard temperature, said control means signals said capacity-varying actuator means for effecting a respective less-than-full-capacity operation of said compressor, said electromagnetic clutch means to connect said compressor in driven relation to a automotive engine, and said air mixing damper to bypass air flowing in said air duct to said vehicle room without heating by said heater core;

(iii) if said required injection temperature is below said main standard temperature and above each said substandard temperature, said control means signals said electromagnetic clutch means to disconnect said compressor from driven relation with an automobile engine, and said air mixing damper to bypass air flowing in said air duct to said vehicle room without heating by said heater core; and
(iv) if said required injection temperature is above said main standard temperature and each said substandard temperature, said control means signals said electromagnetic clutch means to disconnect said compressor from driven relation with an automobile engine, and said air mixing damper to open.

19. The automotive air conditioning system of claim 18, wherein:
said computerized control means comprises a microcomputer.

20. An automotive air conditioning system as claimed in claim 18, wherein:
said sensor means includes an outside temperature sensor detecting outdoor temperature.

21. An automotive air conditioning system as claimed in claim 18, wherein:
said sensor means includes a water temperature sensor detecting the temperature of the water of said heating core.

22. An automotive air conditioning system as claimed in claim 18, wherein:
said sensor means includes an evaporator outlet temperature sensor detecting the temperature of the air at the outlet of said refrigerant evaporator.

23. An automotive air conditioning system as claimed in claim 18, wherein:
said sensor means includes a solar radiation sensor detecting the quantity of solar radiation.

24. The automotive air conditioning system of claim 18, wherein:
said blower is constructed and arranged to operate with variable rotational velocity; and
said computerized control means is operatively connected to said blower for regulating rotational velocity of said blower in relation to said required injection temperature.

25. The automotive air conditioning system of claim 18, wherein:
said computerized control means is constructed and arranged to control capacity of said compressor in relation to at least two said greater substandard temperatures, including a medium substandard temperature and, above that, a higher substandard temperature, both being above said lower substandard temperature, as follows:
(vi) if said required injection temperature is below said main standard temperature and below said medium substandard temperature but above said lower substandard temperature, said control means signals capacity-varying actuator means for effecting intermediate-capacity operation of said compressor, said electromagnetic clutch means to connect said compressor in driven relation to an automotive engine, and said air mixing damper to bypass air flowing in said air duct to said vehicle room without heating by said heater core;

(vii) if said required injection temperature is below said main standard temperature and below said higher substandard temperature but above said medium substandard temperature, said control means signals said capacity-varying actuator means for effecting low capacity operation of said compressor, said electromagnetic clutch means to connect said compressor in driven relation to an automobile engine, and said air mixing damper to bypass air flowing in said air duct to said vehicle room without heating by said heater core; and (vii) if said required injection temperature is above said medium substandard temperature and below said higher substandard temperature, said control means signals said capacity-varying actuator means for effecting low capacity operation of said compressor, and said electromagnetic clutch means to connect said compressor in driven relation to an automobile engine.

* * * * *